(12) United States Patent
Johansson

(10) Patent No.: US 7,697,902 B2
(45) Date of Patent: Apr. 13, 2010

(54) RADIO FREQUENCY REMOTE CONTROL

(75) Inventor: Paul Johansson, Malmö (SE)

(73) Assignee: Sony Ericsson Mobile Communications AB, Lund (SE)

( * ) Notice: Subject to any disclaimer, the term of this patent is extended or adjusted under 35 U.S.C. 154(b) by 812 days.

(21) Appl. No.: 11/270,139

(22) Filed: Nov. 9, 2005

(65) Prior Publication Data

US 2007/0105507 A1     May 10, 2007

(51) Int. Cl.
| | |
|---|---|
| H04B 1/40 | (2006.01) |
| H04B 1/16 | (2006.01) |
| H04B 1/06 | (2006.01) |
| H04M 3/00 | (2006.01) |
| G05B 23/02 | (2006.01) |
| G06K 9/00 | (2006.01) |
| G06T 1/00 | (2006.01) |
| G06T 7/00 | (2006.01) |
| H04J 9/00 | (2006.01) |
| H04J 7/00 | (2006.01) |
| H04L 5/04 | (2006.01) |
| H04W 4/00 | (2009.01) |
| H03D 1/24 | (2006.01) |
| H03D 3/18 | (2006.01) |

(52) U.S. Cl. .................. 455/88; 455/211; 455/344; 455/420; 340/3.1; 340/3.7; 340/5.53; 370/204; 370/212; 370/338; 375/320; 375/328

(58) Field of Classification Search ....... 455/3.01–3.06, 455/92, 419, 420, 443, 550.1, 553.1, 567, 455/16, 17, 23, 418, 552, 553, 556.1, 556.2, 455/102, 142, 143, 144, 150.1, 151.4, 2.01, 455/83, 88, 209, 211, 314, 344, 403, 414.3, 455/456.2, 552.1, 76, 42–45, 61–63.4, 106; 375/295, 298, 219, 320–322, 328; 700/94; 332/103, 105, 119, 108, 120, 151, 183, 184; 340/3.1, 5.53, 3.7, 3.71, 5, 53; 370/466, 370/204, 205, 212, 215, 217–220, 335–338; 725/23, 24, 100, 106, 131, 62
See application file for complete search history.

(56) References Cited

U.S. PATENT DOCUMENTS 5,422,931 A * 6/1995 Austin-Lazarus et al. 455/553.1

(Continued)

*Primary Examiner*—Nay A Maung
*Assistant Examiner*—Paul P Tran
(74) *Attorney, Agent, or Firm*—Myers Bigel Sibley & Sajovec, P.A.

(57) ABSTRACT

A control signal is wirelessly transmitted from a first radio communication unit of a portable communication device to a second radio communication unit. The portable communication device is provided for radio communication over a first radio frequency band using a first modulation technique. The control signal is transmitted by generating a control signal, switching off the first modulation of a carrier signal, shifting the frequency of the carrier signal from a first radio frequency band to a second radio frequency band for the first radio communication unit, switching on the second modulation of the carrier signal having a frequency within the second radio frequency band, wherein the carrier signal is modulated with the control signal, and transmitting the control signal modulated carrier signal wirelessly over the second radio frequency band to the second radio communication unit.

14 Claims, 3 Drawing Sheets

U.S. PATENT DOCUMENTS

| | | | |
|---|---|---|---|
| 5,671,267 A * | 9/1997 | August et al. | 455/420 |
| 5,901,366 A * | 5/1999 | Nakano et al. | 455/550.1 |
| 6,216,017 B1 * | 4/2001 | Lee et al. | 455/567 |
| 6,295,448 B1 * | 9/2001 | Hayes et al. | 455/420 |
| 6,466,832 B1 * | 10/2002 | Zuqert et al. | 700/94 |
| 6,487,422 B1 * | 11/2002 | Lee | 455/550.1 |
| 7,254,182 B2 * | 8/2007 | Tsui | 375/295 |
| 2002/0137496 A1 * | 9/2002 | Nagaoka et al. | 455/414 |
| 2006/0041923 A1 * | 2/2006 | McQuaide | 725/131 |
| 2006/0142052 A1 * | 6/2006 | Lai et al. | 455/552.1 |
| 2007/0030116 A1 * | 2/2007 | Feher | 340/5.53 |

* cited by examiner

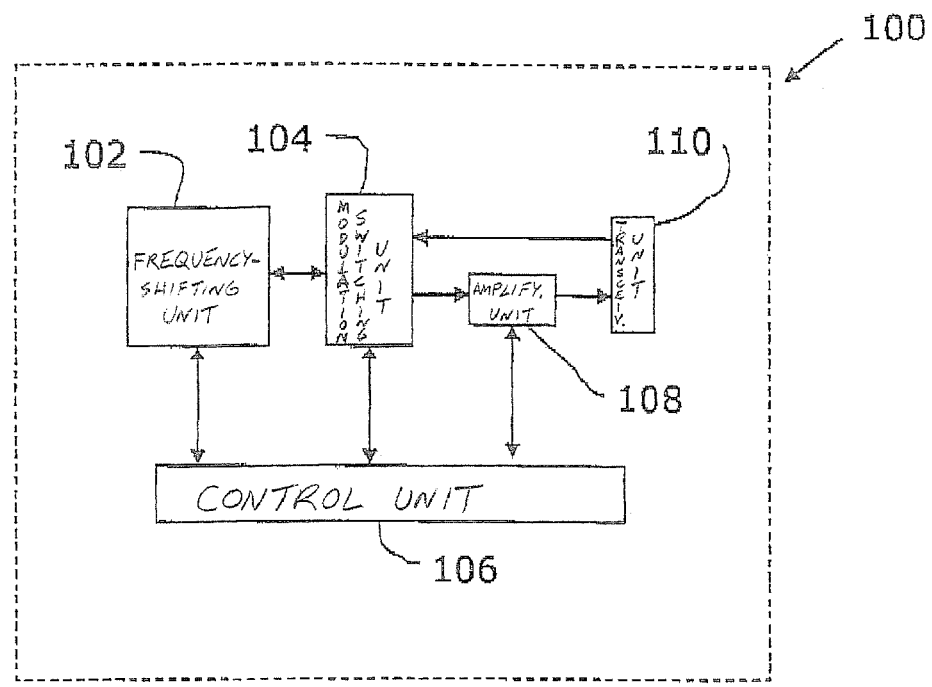
FIG. 1
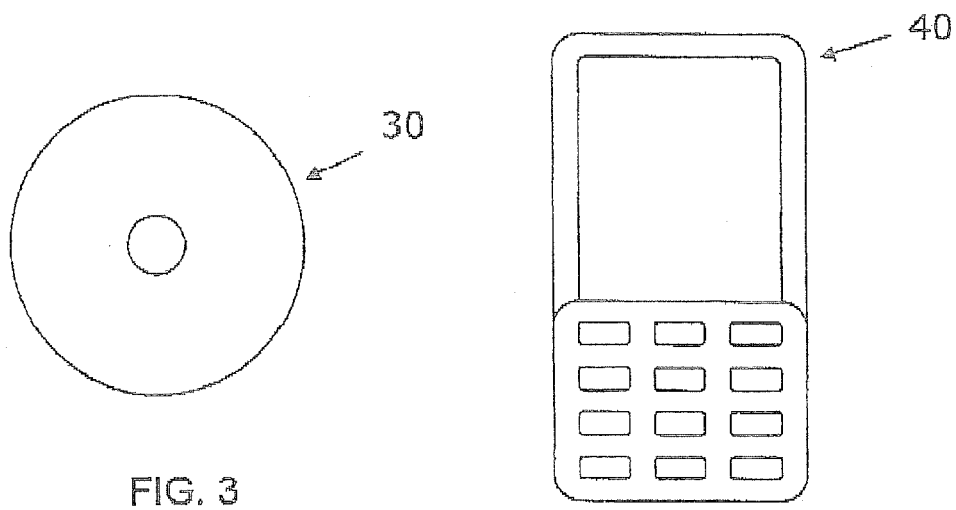
FIG. 3
FIG. 4

RADIO FREQUENCY REMOTE CONTROL

FIELD OF THE INVENTION

The present invention relates in general to providing remote control functionality, and in particular to providing a portable radio communication remote control.

BACKGROUND OF THE INVENTION

More and more electronic devices, such as video cameras, TV sets, and surround sound systems comprise a remote control functionality, which control functionality can be used by using an external remote control terminal. The external remote control terminals are typically either device specific and tailored according to the functions and the proposed needs and desires of a user, or programmable to enable controlling of various devices.

It is well known to use infra red (IR) frequencies for the transmission of control signals from the remote control to the device to be controlled. One drawback of IR remote controls is that IR frequencies behave like electromagnetic light in the sense that free eyesight is needed between the remote control and the controlled device to successfully transfer control signals by using IR from the remote control to the device to be controlled by using normal transmission power levels. Another disadvantage is that the remote control often has to be directed to the device to be controlled because the IR light often is transmitted in a relatively little solid angle straight ahead.

It is also known to use diffus IR light, that is, to transmit IR light in a larger solid angle and to enable receiving control signals in a similar manner in a larger solid angle. By transmitting control signals from a remote control to a device to be controlled by using such a diffus IR light technique, the directioning of the remote control toward the device to be controlled may become less critical. However, the drawback of requiring free eyesight between the remote control and the device to be controlled remains unchanged for normal transmission power levels.

An alternative to transmitting IR signals is to transmit radio frequency signals between a remote control and the device to be controlled. This is also well known and is used in various applications, such as radio-controlled toys, garage door maneuvering functions, bomb disarming robots, etc.

When remotely controlling a toy or when opening or closing the garage door, a remote control terminal is used for transmitting the control signals over the air. The remote control, being an extra item to bring along, has to be localized and needs to be available for the user to be able to remotely control the toy or the garage door, for example. Looking for a remote control terminal in the car, for instance, under way can also be hazardous because attention is at least momentarily not focused on safely driving the vehicle.

Moreover, it is well known to use the Bluetooth™ wireless radio communication system for remotely controlling electronic devices. One drawback with the Bluetooth™ system, is that the Bluetooth™ radio communication module, which is currently needed for the radio communication using Bluetooth™, is still expensive. As both the remote control terminal as well as the electronic device to be controlled are required to comprise a Bluetooth™ module, both these items become expensive. It is noted that Bluetooth™ was designed for more demanding applications requiring a larger bandwidth, such as for wireless voice calls.

There is hence still a need to overcome the various disadvantages and drawbacks of the prior art techniques.

SUMMARY OF THE INVENTION

Some embodiments of the invention are directed towards solving the problem of overcoming the requirement of needing a separate and expensive remote control for the radio control of electronic devices.

This is achieved by making use of radio functionality over a radio frequency band other than what the functionality was designed for.

A first object of some embodiments of the present invention is to provide a method for making use of radio functionality over a radio frequency band other than what the functionality was designed for.

According to one aspect of this invention, this object is achieved by a method for transmitting a control signal wirelessly from a first radio communication unit of a portable communication device to a second radio communication unit, wherein the portable communication device is provided for radio communication over a first radio communication frequency band using a first type modulation technique, comprising the step of generating a control signal, switching off the first type modulation of a carrier signal having a frequency-within the first radio communication frequency band for the first radio communication unit, shifting the frequency of the carrier signal from the first radio communication frequency band to a second radio communication frequency band for the first radio communication unit, switching on the second type modulation of the carrier signal having a frequency within the second radio communication frequency band, wherein the carrier signal is modulated with the control signal, transmitting the control signal modulated carrier signal wirelessly over the second radio communication frequency band to the second radio communication unit, in order to provide the control signal for controlling a second communication device comprising the second radio communication unit.

A second aspect of the present invention is directed towards a method including the features of the first aspect, wherein the first radio communication frequency band comprises the Global System for Mobile Communication (GSM) frequency band.

A third aspect of the present invention is directed towards a method including the features of the first aspect, wherein the second radio communication frequency band comprises the Industrial, Scientific and Medical (ISM) frequency band.

A fourth aspect of the present invention is directed towards a method including the features of the first aspect, wherein the step of shifting the carrier signal frequency comprises shifting the carrier frequency to a frequency within the interval 914-916 MHz.

A fifth aspect of the present invention is directed towards a method including the features of the first aspect, wherein the second type modulation comprises pulse modulation of the carrier signal.

A sixth aspect of the present invention is directed towards a method including the features of the first aspect, wherein the second type modulation comprises amplitude pulsing of the carrier signal.

A seventh aspect of the present invention is directed towards a method including the features of the first aspect, wherein the second type modulation comprises frequency modulation of the carrier signal.

An eighth aspect of the present invention is directed towards a method including the features of the first aspect, further comprising the steps of switching off the second type modulation of the carrier signal having a frequency within the second radio communication frequency band for the first radio communication unit, shifting the carrier signal frequency from the second radio communication frequency band to the first radio communication frequency band, for the first radio communication unit, and switching on the first type modulation of the carrier signal having a frequency within the first radio communication frequency band, so that radio communication over the first radio communication frequency band using the first type modulation technique is enabled.

A ninth aspect of the present invention is directed towards a method including the features of the first aspect, further comprising the steps of receiving a third type signal by the first radio communication unit from the second radio communication unit over the second frequency band, and adapting the portable communication device according to the received third type signal to the type of second radio communication unit.

A second object of some embodiments of the present invention is to provide a device for making use of radio functionality over a radio frequency band other than what the functionality was designed for.

According to a tenth aspect of the present invention, this object is achieved by a portable communication device for transmitting a control signal wirelessly from a first radio communication unit to a second radio communication unit, wherein the portable communication device is suited for radio communication over a first radio communication frequency band using a first type modulation technique, said portable communication unit comprising a carrier frequency shifting unit, being arranged to shift the carrier signal frequency between the first radio communication frequency band and a second radio communication frequency band, a carrier signal modulation switching unit connected to the carrier frequency shifting unit and wherein the carrier signal modulation switching unit is arranged to switch the modulation of the carrier signal between the first type modulation technique and a second type modulation technique wherein the carrier signal is modulated using the control signal in the second type modulation technique, a transmitting unit connected to the carrier signal modulation switching unit, and wherein the transmitting unit is arranged to transmit the modulated carrier signal, and a control unit being coupled to the carrier frequency shifting unit, to the carrier signal modulation switching unit and to the transmitting unit, and wherein the control unit is arranged to generate a control signal, to control the switching off of the first type modulation of the carrier signal having a frequency within the first radio communication frequency band, to control shifting the frequency of the carrier signal from the first radio communication frequency band to a second radio communication frequency band, to control switching on the second type modulation of the carrier signal having a frequency within the second radio communication frequency band, and to control transmitting of the control signal modulated carrier signal wirelessly over the second radio communication frequency band to the second radio communication unit, such that the second radio communication unit can be controlled by the portable communication device.

An eleventh aspect of the present invention is directed towards a portable communication device including the features of the tenth aspect, further comprising a receiving unit connected to the carrier signal modulation switching unit being arranged to receive a third type signal from the second communication unit over the second frequency band, and wherein the control unit further is arranged to adapt the portable communication device according to the received third type signal to the type of second radio communication unit.

A twelfth aspect of the present invention is directed towards a portable communication device including the features of the tenth aspect, further comprising a power amplifying unit connected between the carrier signal modulation switching unit and the transmitting unit, and to the control unit, wherein the power amplifying unit is arranged to amplify the amplitude of the carrier signal using a carrier signal frequency within the second radio communication frequency band, and wherein the control unit further is arranged to control the power amplifying unit, such that the carrier signal is amplitude modulated with the control signal being received from the control unit.

A thirteenth aspect of the present invention is directed towards a portable communication device including the features of the tenth aspect, wherein the portable communication device is a mobile phone.

A third object of some embodiments of the present invention is to provide a computer program product comprising a computer readable medium, having thereon computer program code means, to make a portable communication device or a computer execute, make use of radio functionality over a radio frequency band other than what the functionality was designed for.

According to a fourteenth aspect of the present invention, this object is achieved by a computer program product comprising a computer readable medium, having thereon computer program code means, to make a portable communication device or a computer execute, when said computer program code means is loaded in the portable communication device or the computer, generating a control signal, switching off a first type modulation of a carrier signal having a frequency within a first radio communication frequency band for a first radio communication unit, shifting the frequency of the carrier signal from the first radio communication frequency band to a second radio communication frequency band for the first radio communication unit, switching on the second type modulation of the carrier signal having a frequency within the second radio communication frequency band, wherein the carrier signal is modulated with the control signal, transmitting of the control signal modulated carrier signal wirelessly over the second radio communication frequency band from the first radio communication unit of a portable communication device, wherein the portable communication device is provided for radio communication over the first radio communication frequency band using the first type modulation technique, to the second radio communication unit, in order to provide the control signal for controlling a second communication device comprising the second radio communication unit.

The present invention may have the following overall advantages:

It is an advantage that it is cheap to implement the method and to provide the portable communication device, according to the present invention, by making use of radio functionality over a radio frequency band other than what the functionality was designed for.

Another advantage is that only a minimum of additional control terminals is needed to realize the method of the present invention.

It should be emphasized that the term "comprises/comprising" when used in this specification is taken to specify the presence of stated features, integers or steps, but does not preclude the presence or addition of one or more other features, integers or steps, or groups thereof.

BRIEF DESCRIPTION OF THE DRAWINGS

The present invention will now be described in more detail in relation to the enclosed drawings, in which:

FIG. 1 schematically shows a portable communication device, according to some embodiments of the present invention, FIG. 3 illustrates a computer program product, having thereon computer program code means to make a portable communication device or a computer execute steps of a method according to some embodiments of the present invention, and FIG. 4 displays a portable communication device in the form of a cellular phone, according to some embodiments of the present invention.

DETAILED DESCRIPTION OF THE EMBODIMENTS

Figure 2A:
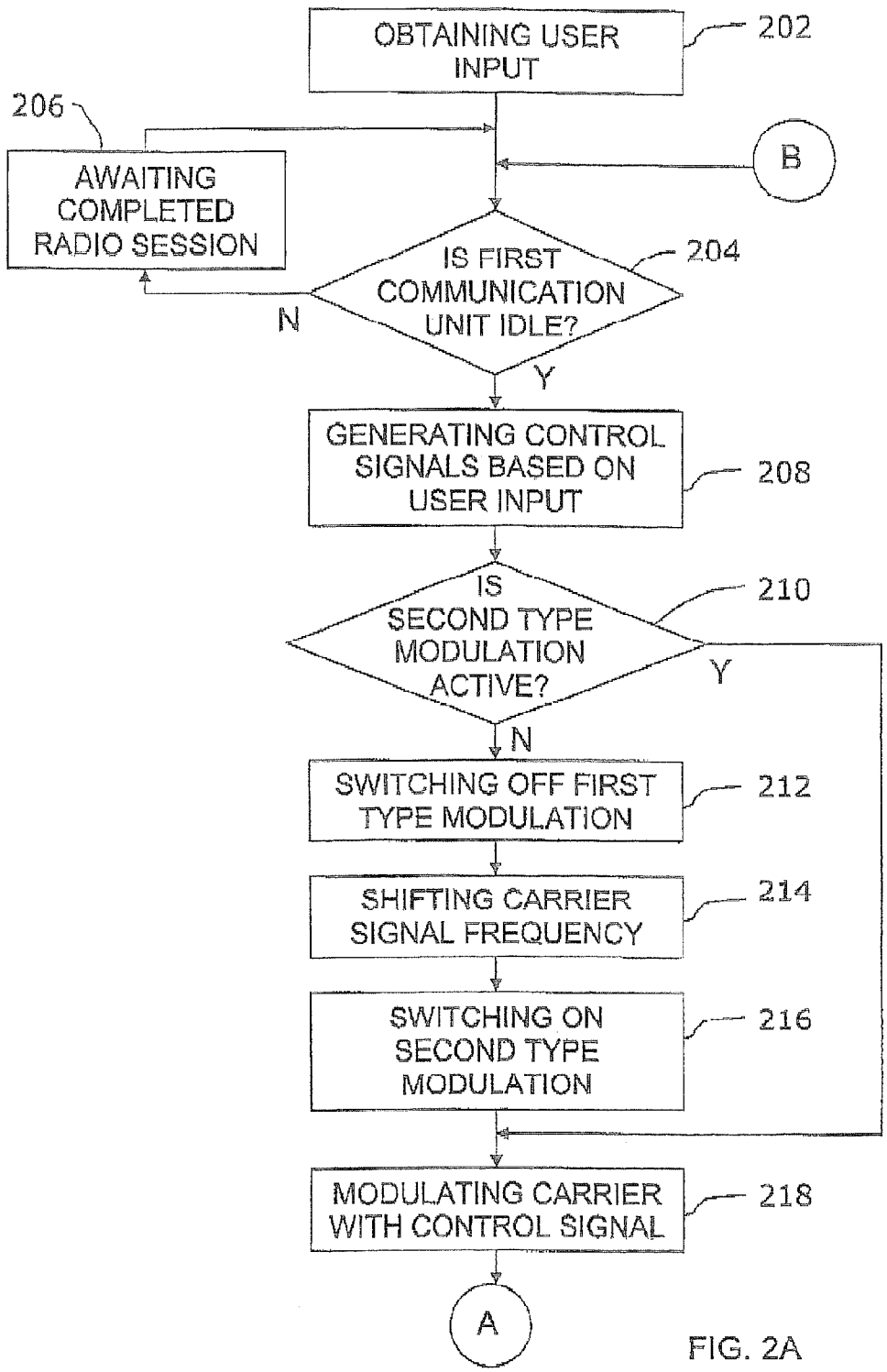
FIGS. 2A and 2B present a flow chart of a method according to some embodiments of the present invention.

While the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention as defined by the claims. Like reference numbers signify like elements throughout the description of the figures.

As used herein, the singular forms "a," "an," and "the" are intended to include the plural forms as well, unless expressly stated otherwise. It will be further understood that the terms "includes," "comprises," "including," and/or "comprising," when used in this specification, specify the presence of stated features, integers, steps, operations, elements, and/or components, but do not preclude the presence or addition of one or more other features, integers, steps, operations, elements, components, and/or groups thereof. It will be understood that when an element is referred to as being "connected" or "coupled" to another element, it can be directly connected or coupled to the other element or intervening elements may be present. Furthermore, "connected" or "coupled" as used herein may include wirelessly connected or coupled. As used herein, the term "and/or" includes any and all combinations of one or more of the associated listed items.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Some embodiments of the invention are thus directed towards solving the problem of overcoming the requirement of needing a separate and expensive remote control for the radio control of electronic devices.

According to some embodiments of the present invention, the radio communication unit of portable communication device, for instance a Global System for Mobile communication (GSM) mobile phone, is arranged to be operated as a remote control for controlling another device comprising a second radio communication unit. Examples of such devices may be found in various areas, being radio controlled toy cars, keylocks as for instance in cars or in car entrances such as garages or the like, light switches or dimmers in real estate applications, to name a few different examples only.

In the radio communication unit of, for instance, a GSM phone, one frequency band that is often used comprises the carrier signal frequency of 900 MHz. The carrier signal is typically modulated to comprise desired speech or possibly data information. There are a number of different techniques to modulate the carrier signal, of which one type is Gaussian Minimum Shift Keying (GMSK). GSM uses one type of GMSK modulation technique.

The underlying idea to some embodiments of the present invention is to transmit signals by using a different modulation technique than the one used in GSM communication and by applying a carrier signal having a frequency that is different from the frequency that is being used in GSM communication, in this example.

With reference to FIG. 1, schematically showing a portable communication device 100, according to some embodiments of the present invention, the invention is now explained in more detail.

The portable communication device 100 may be a cellular phone. The portable communication device comprises a carrier frequency-shifting unit 102, a carrier signal modulation-switching unit 104, a control unit 106, an amplifying unit 108 and a transceiving unit 110. The transceiving unit 110 may be separated in a transmitting unit and a receiving unit in some embodiments.

As can be seen in FIG. 1 the carrier frequency-shifting unit 102 is connected to the carrier signal modulation-shifting unit 104. The control unit 106 is connected to both the carrier frequency shifting unit 102 and the carrier signal modulation-switching unit 104. The amplifying unit 108 has connection to the control unit 106, to the transceiving unit 110 and to the carrier signal modulation-switching unit 104. The transceiving unit 110 is further connected to the carrier signal modulation-switching unit 104.

According to other embodiments, the units as comprised within the portable communication device 100 of FIG. 1, may be connected to each other in a different way. The number of units may be different than the one as displayed, as some units may be comprised in others, such as the carrier frequency shifting unit 102 may be comprised in the carrier signal modulation switching unit 104, to give one example.

According other embodiments of the present invention, the portable communication device, is void of the amplifying unit 108, as shown in FIG. 1.

Figure 2B:
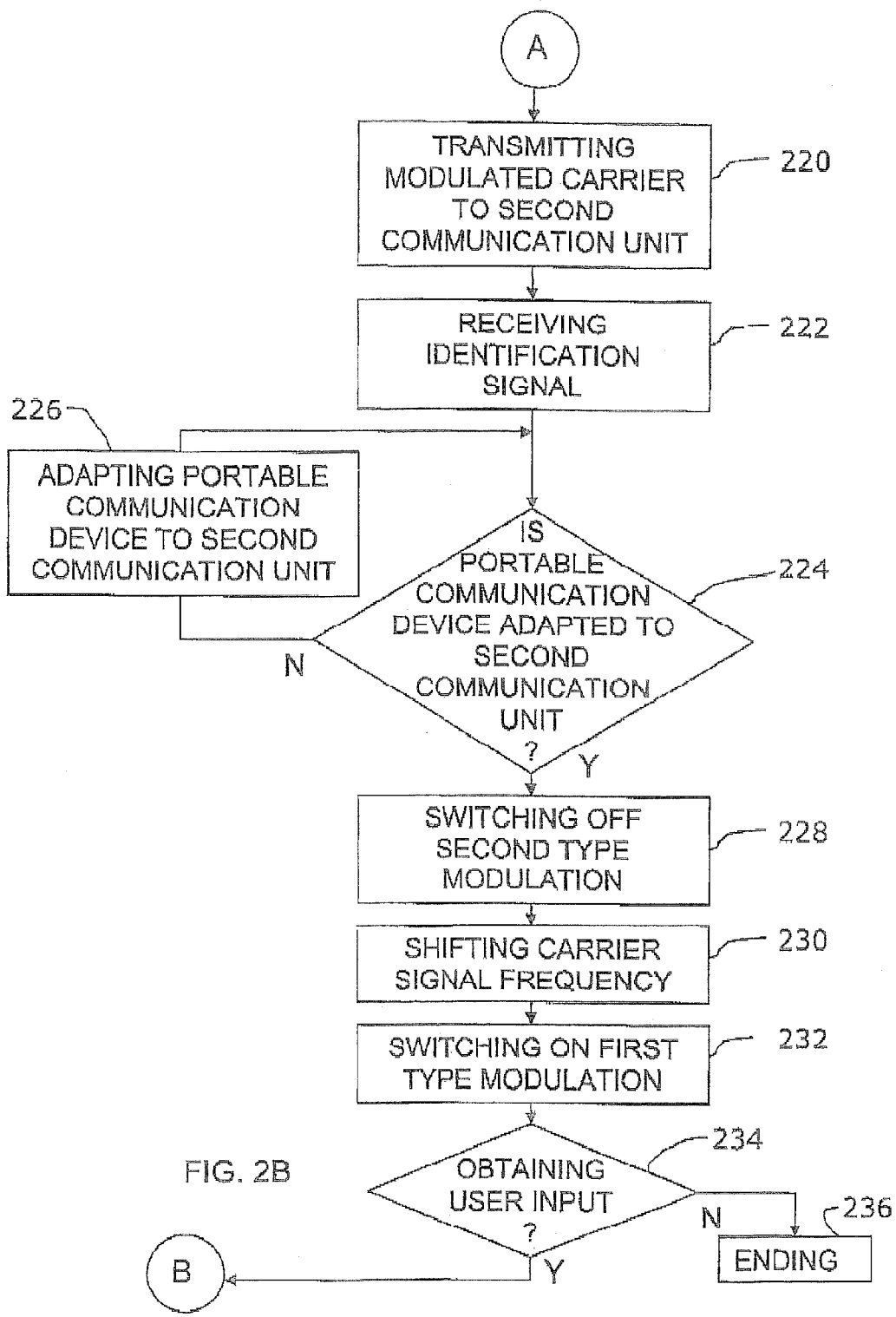

By referring to FIGS. 2A and 2B a method according to some embodiments of the present invention is now described.

The first step of the method according to some embodiments of the invention is the step of obtaining user input, step 202, as shown in the flow chart of FIGS. 2A and 2B.

According to other embodiments of the present invention, user input may not be used to radio control an electronic device. In such embodiments, information on how to run a method may be stored beforehand, typically by using programmed devices.

User input may, however, be obtained when a user is handling a cellular phone, being one example of a portable communication device. The method as described in the flow chart can be applied to a number of different devices that comprise a second radio communication unit. Let us here for simplicity assume that the portable communication device is a cellular phone and that the device that is being controlled is a radio controlled toy car, being one non-restrictive example only.

If user input is obtained, such input is typically obtained by the control unit 106.

Obtaining user input may for instance be obtaining information that a user of the cellular phone wishes to make a left hand turn or to steer the radio controlled toy car straight ahead, in step 202. After having obtained user input, the cellular phone, as one example of the portable communication device, determines whether the radio communication unit in the cellular phone is idle or not, that is, to determine whether the radio communication unit currently is being used for GSM communication, or not. This is determined within the step: "Is the first communication unit idle?," step 204, where the radio communication unit in the cellular phone is one example of a first communication unit.

In general, when the radio communication unit of a GSM cellular phone is in idle mode, the radio communication unit is less busy than during a GSM phone call. Because the phone call functionality of a GSM cellular phone usually is given higher priority than the functionality of remotely controlling a toy car, it is determined whether the radio communication unit of the cellular phone is idle or not.

If it is determined that the radio communication unit is not idle in step 204, the step of awaiting completed radio session, step 206, is follows. Since radio controlling of a usual toy car is not time critical, the step of waiting until any on-going radio session is completed is hardly affecting the controlling in any negative manner. Having waited the completed radio session in step 206, the step of determining whether or not the same first communication unit of the cellular phone is idle, step 204, is performed. Because the radio session was completed in step 206, the first radio communication is likely to be idle, when re-executing step 204.

According to some embodiments, it is the control unit 106 that performs steps 204 and 206, with the aid of the carrier signal modulation-switching unit 104.

The cellular phone has now determined that the first communication unit of the cellular phone is idle in step 204, after which the method comprises the step of generating control signals, step 208, based on the user input as obtained in step 202. The generation of control signals is, according to some embodiments of the present invention, performed by the control unit 106 of the cellular phone, 100. This step may comprise converting, for example, a left hand turn detection signal to a control signal to be transmitted to the device to be controlled, that is, the toy car.

Because the GSM frequency band is reserved for GSM communication, the carrier signal that is used for the radio control of devices has to fall within a frequency band, different from the GSM band. One frequency band that is open for radio control of various devices is the Industrial, Scientific and Medical frequency (ISM) band. This band comprises a number of frequency intervals of which the frequency interval 863-870 MHz is well suited for radio control applications. According to one embodiment of the present invention a frequency of 868 MHz is used for the carrier signal. This embodiment of the invention is one that is suited for the European frequency allocation scheme. Consequently, according to other embodiments of the present invention, the carrier frequency for the radio control of devices is set to 915 MHz, which is well suited to the American frequency allocation scheme.

Having generated control signals in step 208, it is now determined whether a second type modulation is active or not. According to some embodiments of the present invention, this step is performed by the control unit 106 based on information from the carrier signal modulation-switching unit 104. According to other embodiments of the present invention, step 208 is performed by the control unit 106 based on information from the carrier frequency-shifting unit 102.

When the cellular phone is being used as a GSM cellular phone, the carrier frequency is within the GSM frequency band and the modulation technique is one form of Gaussian minimum shift keying (GMSK) modulation format, namely 0.3 GMSK. This is one example of a first type modulation, which is one that is suited for the normal operation of the GSM cellular phone.

One example of a second type modulation is amplitude modulation of the carrier signal. Another example of a second type modulation is frequency modulation of the carrier signal. In both of these examples the carrier signal is modulated with the control signal that was generated in step 208.

In step 210, it is determined by the control unit 106 whether a second type modulation is active for the modulation of the carrier signal or not.

In the case where a radio communication over a GSM frequency band has just completed, the modulation technique is of the GMSK type, that is, a first type modulation. In step 210, it is thus determined by the control unit that a second type modulation technique is not active.

Consequently the following step is the step of switching off the first type modulation, step 212, that is, to switch off the GMSK type of modulation of the carrier signal. According to some embodiments of the present invention, this step is performed by the carrier signal modulation-switching unit 104 under control of the control unit 106.

After having switched off the GMSK type of modulation, the carrier signal is unmodulated and has not yet received any dependency of the control signal that was generated in step 208.

To leave the GSM frequency band behind in favour of a frequency within one frequency interval of the ISM band, the carrier signal frequency is shifted. This is performed in step 214, shifting the carrier signal frequency. According to some embodiments of the present invention, this step is performed by the carrier frequency-shifting unit 102 under the control of the control unit 106.

As mentioned previously, according to the European frequency allocation scheme, a carrier signal frequency within the interval 863-870 MHz is suitable for the radio controlling purposes in Europe. According to some embodiments of the present invention the carrier signal is shifted to a frequency of 868 MHz, in step 214.

For radio controlling purposes that are in line with the American frequency allocation scheme, the carrier signal frequency is shifted to a frequency of 915 MHz, in step 214, according to other embodiments of the present invention, as mentioned above.

After having shifted the unmodulated carrier signal outside the GSM band, the step of switching on a second type modulation, step 216, is performed by the carrier signal modulation-switching unit 104 under control of the control unit 106.

According to some embodiments of the present invention, the second type comprises amplitude modulation of the carrier signal. According to particular embodiments of the present invention, the second type modulation technique comprises pulse modulation of the carrier signal.

According to some embodiments of the present invention, the second type modulation comprises phase shift keying, being one type of phase modulation of the carrier signal. For this embodiment the amplifying unit 108, as displayed in FIG. 1, in the portable communication device 100, may not be needed and may thus be omitted.

Having switched on the second type modulation in step 216, the next step of the method for transmitting a control signal wirelessly according to some embodiments of the present invention is the step of modulating the carrier signal with the control signal, step 218.

If it is determined in step 21, by the carrier signal modulation switching unit 104 under the control of the control unit 106, that the second type modulation is active, steps 212-216 need not to be executed and the method is continued by executing step 218, modulating carrier with control signal.

According to some embodiments of the present invention this step, step 218, is again performed by the carrier signal modulation-switching unit 104 under the control of the control unit 106.

The portable communication device as shown in FIG. 1, being one embodiment of the present invention comprises an amplifying unit 108. It is this amplifying unit 108 that is used for pulse modulation of the carrier signal with the control signal. The amplifying unit 108 is switched on and off in relation to the control signal, which results in a carrier signal being pulse modulated with the control signal.

According to particular embodiments of the present invention, the carrier signal is now pulse modulated with the control signal that was generated in step 208.

In the example where the control unit 106 obtains user input in the form of a left hand turn detection signal, the carrier signal is pulse modulated with the control signal that was generated, for instance, based on the left hand turn detection signal.

With reference to FIG. 2B, the following step is the step of transmitting the modulated carrier signal to a second communication unit, step 220, where the second communication unit may be comprised in the device that is subject to control, in this example, the radio controlled toy car.

The carrier signal having a frequency within the ISM band is thus modulated by the control signal that was generated based on user input, and the modulated carrier signal is transmitted from the cellular phone to the radio controlled toy car, in the example.

The step of transmitting the modulated carrier signal may be performed by the transceiving unit 110, being one implementation of a transmitting unit, under the control of the control unit 106.

The radio controlled toy car in the example may, moreover, be designed to transmit an identification signal, as one example of a third type of signal. According to some embodiments of the present invention, the following step is for this reason the step of receiving an identification signal step 222, by the cellular phone or rather the transceiving unit 110, from the radio controlled device, in this example being the radio controlled toy car.

Having received an identification signal, the step of determining whether the portable communication device is adapted to the second communication unit of the radio controlled device, or not, step 224, is next executed by the control unit 106.

If the cellular phone is already adapted to the identification signal as received from the toy car, the cellular phone may already have adapted for instance the user interface, such as the display and the keypad by tailoring functions to certain keys, to enhance the user experience when radio controlling the toy car by the cellular phone.

If it is determined in step 224 by the control unit 106 that the cellular phone is not adapted to the identification signal, step 226 follows and that is adapting the portable communication device to the second communication unit, as comprised in the toy car.

If the identification signal is received by the cellular phone, the method according to the present invention ensures, in this embodiment, that the cellular phone is adapted to the controlling of the toy car.

The adaptation setting of the cellular phone remains set as long as the cellular phone 100 obtains user input indicating that the user wishes to continue remotely controlling the toy car, according to some embodiments of the present invention.

The idea behind the next three steps is to reset the carrier frequency and the modulation type to those applied prior to the step of switching off the first type modulation, step 212.

This means that the next step of the method, according to some embodiments of the present invention, is step 228, switching off the first type modulation, which is executed by the carrier signal modulation switching unit 104 under the control of the control unit 106.

Having obtained an unmodulated carrier signal, by switching off the second type modulation in step 228, the carrier frequency shifting unit 102 executes step 230, shifting carrier signal frequency, under the control of the control unit 106.

The carrier frequency is here shifted back to a frequency within the GSM frequency band, typically 900 MHz, according to some embodiments of the present invention.

To enable operation of the cellular phone, the carrier signal modulation switching unit 104 thereafter executes step 232, that is switching on first type modulation, to switch on the GMSK type modulation, as used in GSM communication.

The cellular phone is now reset and fully operable for GSM communication.

It is now determined by the control unit 106 whether user input is obtained or not, in step 234.

If user input indicating that the user wishes to continue controlling the toy car is obtained, the method for transmitting a control signal, according to some embodiments of the present invention, now comprises the step of determining whether the cellular phone is idle, in step 204, enabling transmitting new control signals to the toy car in subsequent steps of the method.

If the control unit determines that no user input is obtained, it executes step 236, that is, ending the method of transmitting a control signal wirelessly to a toy car.

In addition, FIG. 3 schematically depicts a computer program product 30, according to some embodiments of the present invention, having thereon computer program code means. When the computer program code means, comprised on the computer program product, is loaded in a computer or portable communication device, said computer or portable communication device, executes generating a control signal, switching off a first type modulation of a carrier signal having a frequency within a first radio communication frequency band for a first radio communication unit, shifting the frequency of the carrier signal from the first radio communication frequency band to a second radio communication frequency band for the first radio communication unit, switching on the second type modulation of the carrier signal having a frequency within the second radio communication frequency band, wherein the carrier signal is modulated with the control signal, transmitting of the control signal modulated carrier signal wirelessly over the second radio communication frequency band from the first radio communication unit of a portable communication device, wherein the portable communication device is provided for radio communication over the first radio communication frequency band using the first type modulation technique, to the second radio communication unit, so that the control signal can be used for controlling a second communication device comprising the second radio communication unit.

The computer program product may be provided as a CD-ROM disc according to some embodiments of the present invention. However, the computer program product 30 can alternatively be provided as another type of disc, such as a DVD disc, a hard disc, a MiniDisc, or be provided as a memory or other storage capacity, such as a flash-based memory, for example a memory stick or a USB (Universal Serial Bus) memory or even a memory of the type being volatile.

FIG. 4 displays a portable communication 40 device in the form of a cellular phone, according to some embodiments of the present invention.

It is emphasized that this invention can be varied in many ways, of which the alternative embodiments above are only examples of a few. These different embodiments are hence non-limiting examples. The scope of the present invention, however, is only limited by the subsequently following claims.

According to other embodiments of the present invention, the steps of the method as described above may be executed in a different order, without deviating from the scope of the invention.

Also, some steps of the method may be omitted, following yet a different embodiment of the present invention.

The number of steps may, moreover, be changed, by, for instance, incorporating a few steps in others or dividing the function of certain steps in other steps, such that novel steps are created but without deviating from the overall function of the steps.

According to yet other embodiments of the present invention, the portable communication device may comprise a personal digital assistant (PDA), a wristwatch and/or a key ring, having a radio communication unit.

The units as comprised in the portable communication device, as shown in FIG. 1, may at least partly be comprised in the radio communication unit as mentioned to be comprised in the cellular phone as discussed, where the radio communication is one example of the first communication unit, according to some embodiments of the present invention. The units as comprised in FIG. 1 and the radio communication units, are, therefore, not exclusive, but may rather coexist, at least according to some embodiments of the present invention.

The described embodiments of the present invention thus carry the following overall advantages:

It is relatively cheap to implement the method and to provide the portable communication device, according to some embodiments of the present invention, by making use of radio functionality over a radio frequency band other than what the functionality was designed for.

Few additional control terminals are needed to realize the method, according to some embodiments of the present invention.

In concluding the detailed description, it should be noted that many variations and modifications can be made to the embodiments without substantially departing from the principles of the present invention. All such variations and modifications are intended to be included herein within the scope of the present invention, as set forth in the following claims.

That which is claimed:

1. A method for transmitting a control signal wirelessly from a first radio communication unit of a portable communication device to a second radio communication unit, wherein the portable communication device is provided for radio communication over a first radio communication frequency band using a first type modulation technique, comprising:

determining whether the first radio communication unit is idle;

generating a control signal;

switching off the first type modulation of a carrier signal having a frequency within the first radio communication frequency band for the first radio communication unit responsive to determining that the first radio communication unit is idle;

shifting the frequency of the carrier signal from the first radio communication frequency band to a second radio communication frequency band for the first radio communication unit;

switching on a second type modulation of the carrier signal having a frequency within the second radio communication frequency band, wherein the carrier signal is modulated with the control signal; and transmitting the control signal modulated carrier signal wirelessly over the second radio communication frequency band to the second radio communication unit so that the control signal can be used for controlling a second communication device comprising the second radio communication unit.

2. The method according to claim 1, wherein the first radio communication frequency band comprises the Global System for Mobile Communication (GSM) frequency band.

3. The method according to claim 1, wherein the second radio communication frequency band comprises the Industrial, Scientific and Medical frequency band.

4. The method according to claim 1, wherein shifting the carrier signal frequency comprises shifting the carrier frequency to a frequency within the interval 914-916 MHz.

5. The method according to claim 1, wherein the second type modulation comprises pulse modulation of the carrier signal.

6. The method according to claim 1, wherein the second type modulation comprises amplitude pulsing of the carrier signal.

7. The method according to claim 1, wherein the second type modulation comprises frequency modulation of the carrier signal.

8. The method according to claim 1, further comprising:

switching off the second type modulation of the carrier signal having a frequency within the second radio communication frequency band for the first radio communication unit;

shifting the carrier signal frequency from the second radio communication frequency band to the first radio communication frequency band for the first radio communication unit; and switching on the first type modulation of the carrier signal having a frequency within the first radio communication frequency band so that radio communication over the first radio communication frequency band using the first type modulation technique is enabled.

9. The method according to claim 1, further comprising:

receiving a third type signal by the first radio communication unit from the second radio communication unit over the second frequency band, and configuring the portable communication device for communication according to the received third type signal to the type of second radio communication unit.

10. A portable communication device for transmitting a control signal wirelessly from a first radio communication unit to a second radio communication unit, wherein the portable communication device is suited for radio communication over a first radio communication frequency band using a first type modulation technique, said portable communication unit comprising:
- a carrier frequency-shifting unit being configured to shift the carrier signal frequency between the first radio communication frequency band and a second radio communication frequency band;
- a carrier signal modulation switching unit connected to the carrier frequency shifting unit, the carrier signal modulation switching unit being configured to switch modulation of the carrier signal between the first type modulation technique and a second type modulation technique wherein the carrier signal is modulated using the control signal in the second type modulation technique,
- a transmitting unit connected to the carrier signal modulation switching unit, the transmitting unit being configured to transmit the modulated carrier signal; and
- a control unit being coupled to the carrier frequency shifting unit, to the carrier signal modulation switching unit and to the transmitting unit, the control unit being configured to determine whether the first radio communication unit is idle, to generate a control signal to control the switching off of the first type modulation of the carrier signal having a frequency within the first radio communication frequency band responsive to determining that the first radio communication unit is idle, to control shifting the frequency of the carrier signal from the first radio communication frequency band to a second radio communication frequency band, to control switching on of the second type modulation of the carrier signal having a frequency within the second radio communication frequency band, and to control transmitting of the control signal modulated carrier signal wirelessly over the second radio communication frequency band to the second radio communication unit, such that the second radio communication unit can be controlled by the portable communication device.

11. The portable communication device according to claim 10, further comprising:
- a receiving unit connected to the carrier signal modulation switching unit being configured to receive a third type signal from a second communication unit over the second frequency band, and
- wherein the control unit configures the portable communication device for communication according to the received third type signal to the type of second radio communication unit.

12. The portable communication device according to claim 10, further comprising:
- a power amplifying unit connected between the carrier signal modulation switching unit and the transmitting unit, and to the control unit, the power amplifying unit being configured to amplify the amplitude of the carrier signal using a carrier signal frequency within the second radio communication frequency band, and
- wherein the control unit is further configured to control the power-amplifying unit such that the carrier signal is amplitude modulated with the control signal being received from the control unit.

13. The portable communication device according to claim 10, wherein the portable communication device is a mobile phone.

14. A computer program product comprising a computer readable medium, having thereon computer program code means, to make a portable communication device or a computer execute, when said computer program code means is loaded in the portable communication device or the computer:
- determining whether the first radio communication unit is idle;
- generating a control signal;
- switching off the first type modulation of a carrier signal having a frequency within the first radio communication frequency band for the first radio communication unit responsive to determining that the first radio communication unit is idle;
- shifting the frequency of the carrier signal from the first radio communication frequency band to a second radio communication frequency band for the first radio communication unit;
- switching on a second type modulation of the carrier signal having a frequency within the second radio communication frequency band, wherein the carrier signal is modulated with the control signal; and
- transmitting the control signal modulated carrier signal wirelessly over the second radio communication frequency band to the second radio communication unit so that the control signal can be used for controlling a second communication device comprising the second radio communication unit.

* * * * *